United States Patent
Stahl

(10) Patent No.: US 6,209,662 B1
(45) Date of Patent: Apr. 3, 2001

(54) METHOD OF AND APPARATUS FOR CONTROLLING DIAMOND DRILL FEED

(75) Inventor: Bert Stahl, Corbeil (CA)

(73) Assignee: Atlas Copco Canada Inc., Quebec (CA)

( * ) Notice: Subject to any disclaimer, the term of this patent is extended or adjusted under 35 U.S.C. 154(b) by 0 days.

(21) Appl. No.: 09/091,655

(22) PCT Filed: Dec. 19, 1996

(86) PCT No.: PCT/CA96/00848

§ 371 Date: Dec. 8, 1998

§ 102(e) Date: Dec. 8, 1998

(87) PCT Pub. No.: WO97/23813

PCT Pub. Date: Jul. 3, 1997

(30) Foreign Application Priority Data

Dec. 21, 1995 (CA) .................................................. 2165936

(51) Int. Cl.[7] ........................................................ E21B 19/08
(52) U.S. Cl. ........................... 175/27; 175/106; 175/203; 175/319; 175/434
(58) Field of Search .............................. 175/24, 26, 27, 175/38, 40, 48, 106, 107, 203, 319, 434

(56) References Cited

U.S. PATENT DOCUMENTS

| | | |
|---|---|---|
| 2,259,694 | 10/1941 | Hoffar . |
| 4,157,231 | 6/1979 | Phillips . |
| 4,354,233 | 10/1982 | Zhukovsky et al. . |
| 4,793,421 | 12/1988 | Jasinski . |
| 4,953,639 | 9/1990 | Hamner et al. . |
| 5,168,937 | 12/1992 | Hamner . |
| 5,348,106 | 9/1994 | Mattero . |
| 5,358,058 | * 10/1994 | Edlund et al. ........................ 175/24 |
| 5,449,047 | 9/1995 | Schivley, Jr. . |
| 5,474,142 | 12/1995 | Bowden . |
| 6,016,878 | * 1/2000 | Jansson ................................. 175/27 |

FOREIGN PATENT DOCUMENTS

| | | |
|---|---|---|
| 1049491 | 2/1979 | (CA) . |
| 1237422 | 5/1988 | (CA) . |
| 2013711 | 10/1990 | (CA) . |
| 2019635 | 2/1991 | (CA) . |
| 94 02 360 | 12/1994 | (DE) . |
| 2 546 963 | 2/1984 | (FR) . |

OTHER PUBLICATIONS

"Introducing the Linear Positioning Module" —5 page brochure—undated.
"Working With Position–Feedback Cylinder Technology" by Richard T. Schneider—Sep. 1996.
"Linear Displacement Transducer Series BTL–2" —BALLUFF—3 pages—undated.
"Proportional Directional Control Valves Series D1FH"–Parker Hannifin Corp.–4 pages–undated.

* cited by examiner

Primary Examiner—Roger Schoeppel
(74) Attorney, Agent, or Firm—Biebel & French

(57) ABSTRACT

Apparatus for controlling a diamond drill feed cylinder which includes a linear position sensor coupled to the feed cylinder for generating a position signal, a positioning module for generating a feed control signal in dependence upon the position signal, a proportional flow control valve having two hydraulic ports for connecting to the feed cylinder and responsive to the feed control signal for controlling flow rate of the two hydraulic ports, a plurality of operation sensors coupled to the diamond drill for generating operation status signals, a plurality of input modules for receiving the operation status signals and converting them to digital operation status signals and a programmable logic controller connected to the plurality of input modules for modifying the feed control signal in dependence upon the digital operation status signals. The rate of penetration of the diamond drill is controlled by controlling the flow rate applied to the feed cylinder. In an alternative embodiment the positioning module, programmable logic controller and input/output modules are integrated into an integrated programmable logic controller.

39 Claims, 3 Drawing Sheets

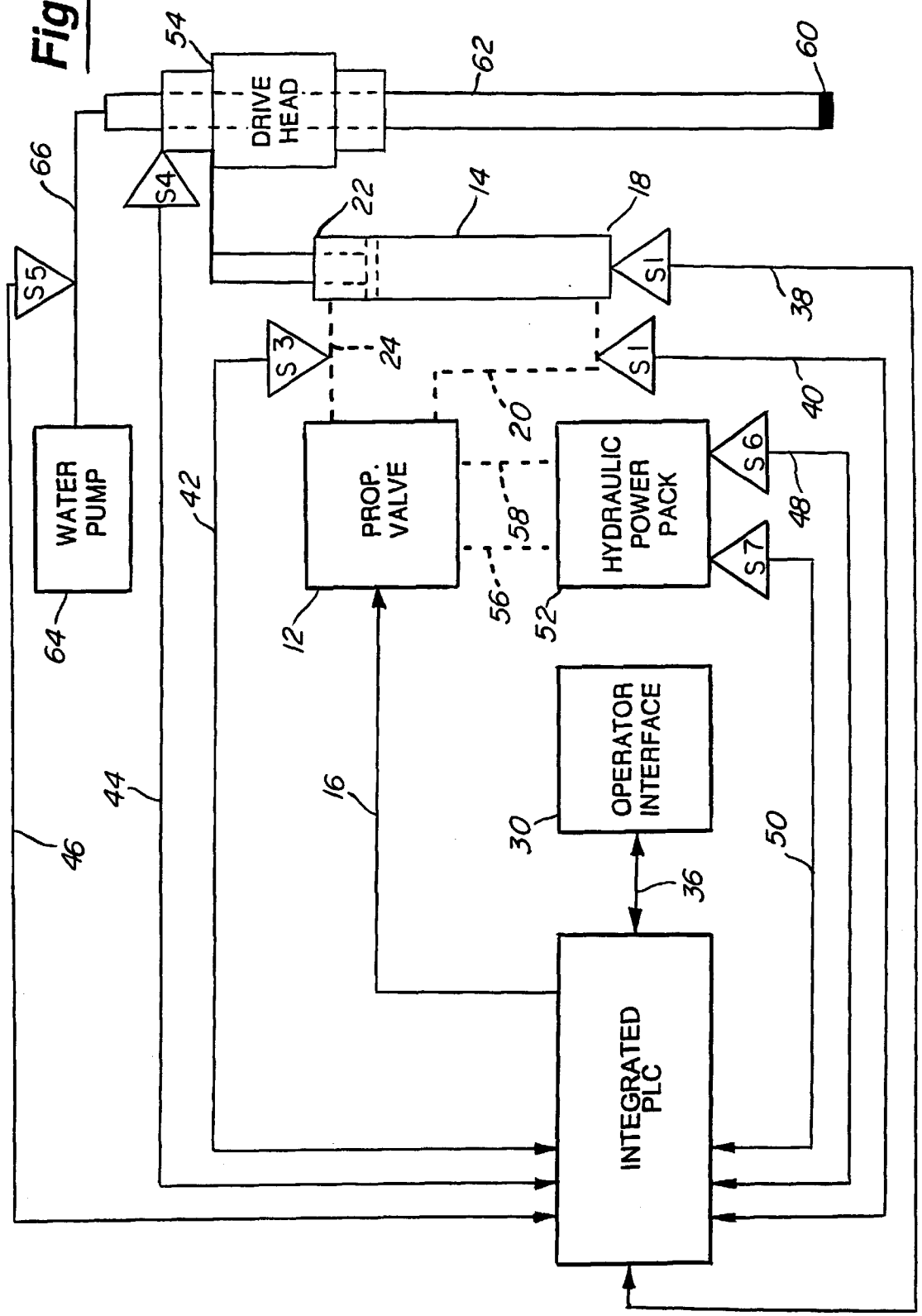

METHOD OF AND APPARATUS FOR CONTROLLING DIAMOND DRILL FEED

The present invention relates to a method of and apparatus for controlling diamond drill feed and is particularly concerned with computer controlled system.

BACKGROUND OF THE INVENTION

Core drilling with a diamond drill consists of rotating a tubular rod string and diamond bit at high speed (normally up to approx. 1800 rpm) and feeding a drill string into a rock formation. Diamonds impregnated in the matrix of the bit cut the rock resulting in a core entering the hollow drill rods as the bit advances. This core is retrieved by methods such as wirelining or reverse circulation, and retained for analysis. Water is pumped down the inside of the drill string (outside the drill string if using reverse circulation) in order to clear the cuttings from the bit, and keep the bit cool. The exposed diamonds on the bit wear and become dull, and thus require sharpening. Sharpening the bit is done in the hole and involves stripping a part of the matrix off the bit in order to expose new diamonds. This drilling and sharpening is a continual process until the bit is worn out and must be replaced. All the rods must be pulled out of the hole to replace the bit, and reinserted with a new bit.

Conventionally, diamond drilling has been done with manually operated hydraulic machines using a pressure controlled feed system. More recently, some attempts have been made to control the drilling process using microprocessors and electrically controlled actuators. To our knowledge, all of these attempts have involved using electric actuators to replace the handle on otherwise manually controlled pressure control valves. This approach may not allow a microprocessor to be used to its full potential in the control of the drilling process. Some of the most important inherent difficulties in these systems include poor positioning accuracy and poor response time to changing load conditions in the hole, as would occur when penetrating through rock formation transitions or faults, and sharpening the bit, particularly in deep hole conditions.

U.S. Pat. No. 4,157,231 discloses a hydraulic drilling unit for precision machine drilling, which uses a modulating servo valve to adjust a feed rate under computer control, but in the positive direction only. Because this patent does not provide a holdback force to compensate for the length and weight of a diamond drill string, it can not be applied to a diamond drill.

U.S. Pat. No. 5,449,047 discloses a computer control system for blast hole drilling, which also uses unidirectional modulation. Again, because it does not provide a holdback force to compensate for the length and weight of drill string, it is not appropriate for a diamond drill. Further, this patent teaches that the drill rate of penetration should be reduced when passing through less dense material or voids.

Germany Patent No. 94 02 360 discloses a computer control system for auger drilling, which also uses unidirectional modulation. Again, because it does not provide a holdback force to compensate for the length and weight of drill string, it is not appropriate for a diamond drill.

SUMMARY OF THE INVENTION

An object of the present invention is to provide an improved method and apparatus for controlling the drilling process on a diamond drill.

In accordance with an aspect of the present invention there is provided an apparatus for controlling a diamond drill, wherein, during operation, a bi-directional hydraulic drive, having a head end and a rod end, is coupled to the drill string of the diamond drill allowing either holdback or pulldown forces to be applied thereto, the apparatus comprising: (a) position sensor means adapted to be coupled to said diamond drill for generating a position signal; (b) computing means, including means for setting a desired rate of drill penetration, for determining a feed rate control signal in response to said position signal and said desired rate of drill penetration; and (c) valve means for controlling hydraulic flows to said bi-directional hydraulic drive which, in use, is coupled to said diamond drill, to apply either holdback or pulldown forces to the latter, in response to said feed rate control signal to approximate the desired rate of drill penetration, thus accommodating for a varying length and weight of drill string.

In accordance with a further aspect of the present invention there is provided a method of controlling a diamond drill, wherein a bi-directional hydraulic drive is coupled to the diamond drill to apply pulldown or holdback forces thereto, the method comprising the steps of: (a) pre-setting a desired rate of drill penetration; (b) sensing a position of said drill and generating a position signal in response thereto; (c) computing a feed rate control signal in response to said position signal and said pre-set desired rate of penetration; and (d) applying the pulldown or holdback forces to said drill during a drilling operation in response to said feed rate control signal to approximate the desired rate of drill penetration.

A further embodiment of the invention includes a hydraulic drive head, a hydraulic feed cylinder coupled to the drive head for changing the position of the drive head, a feed control apparatus including a linear position sensor coupled to the feed cylinder for generating a position signal, a positioning module for generating a feed control signal in dependence upon the position signal, a flow control valve having two hydraulic ports for connecting to the feed cylinder and responsive to the feed control signal for controlling flow rate of the two hydraulic ports, a plurality of operation sensors coupled to the diamond drill for generating operation status signals, a plurality of input modules for receiving the operation status signals and converting them to digital operation status signals and a programmable logic controller connected to the plurality of input modules for modifying the feed control signal in dependence upon the digital operation status signals.

A still further embodiment of the invention includes a hydraulic drive head, a hydraulic feed cylinder coupled to the drive head for changing the position of the drive head, a feed control apparatus including a linear position sensor coupled to the feed cylinder for generating a position signal, an integrated programmable logic controller including positioning means, input means and logic means, said positioning means for generating a feed control signal in dependence upon the position signal, a flow control valve having two hydraulic ports for connecting to the feed cylinder and responsive to the feed control signal for controlling flow rate of the two hydraulic ports, a plurality of operation sensors coupled to the diamond drill for generating operation status signals, said input means for receiving the operation status signals and converting them to digital operation status signals and said logic means connected to said input means for modifying the feed control signal in dependence upon the digital status signals.

A feed system controlling flow rate to the feed cylinder offers many advantages over the conventional drill as well as over those using microprocessors to control pressure control valves.

The foregoing and other objects of the invention are accomplished by utilizing a microprocessor controlled closed loop positioning system-to control the rate of penetration (ROP) at the desired level.

BRIEF DESCRIPTION OF THE DRAWINGS

The present invention will be further understood from the following description with reference to the drawings in which:

FIG. 3 illustrates, a stylized block drawing, a diamond drill including the feed control apparatus in accordance with a second embodiment of the present invention.

DETAILED DESCRIPTION OF THE INVENTION

Figure 1:
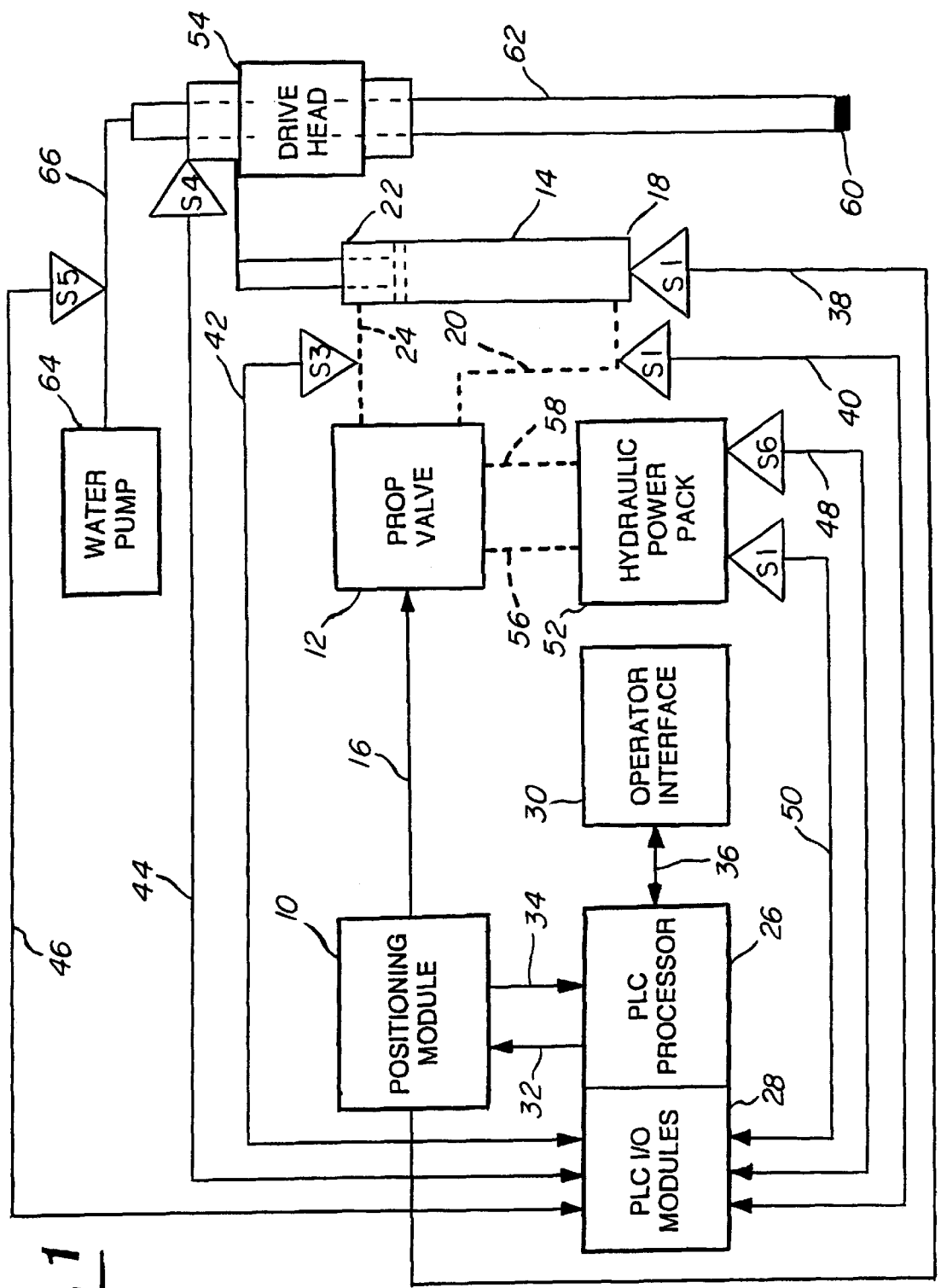
FIG. 1 illustrates, a stylized block drawing, a diamond drill including the feed control apparatus in accordance with an embodiment of the present invention.

Referring to FIG. 1, there is illustrated, in a stylized block diagram, a diamond drill including a feed control apparatus in accordance with an embodiment of the present invention. The feed control apparatus includes a primary closed loop control having a positioning module 10, a proportional valve 12, a feed cylinder 14, and a linear displacement transducer (S1). Output from the positioning module 10 is applied as input to the proportional valve 12 via a line 16. Hydraulic output from the proportional valve 12 is applied to a head end 18 of feed cylinder 14 via a first hydraulic line 20 and to a rod end 22 of feed cylinder 14 via a second hydraulic line 24.

A secondary or supervisory control system includes a programmable logic controller (PLC) 26, PLC input/output (I/O) modules 28, an operator interface 30, a feed cylinder head end pressure transducer S2, a feed cylinder rod end pressure transducer S3, a drive head chuck RPM sensor S4, a water pressure sensor S5, a rotation pressure sensor S6, and a current sensor S7.

The programmable logic controller 26 is connected to the positioning module 10 via a first line 32 for sending commands thereto and via a second line 34 for receiving status therefrom. The operator interface 30 is connected to the programmable logic controller 26 via a line 36. The linear displacement transducer S1 is connected directly to the positioning module 10 via a line 38. The feed cylinder head end pressure transducer S2, the feed cylinder rod end pressure transducer S3, the drive head chuck RPM sensor S4, a water pressure sensor S5, the rotation pressure sensor S6, and the current sensor S7 are connected to the PLC I/O modules 28 via lines 40, 42, 44, 46, 48, and 50, respectively.

The hydraulic circuit is completed by a hydraulic power pack 52 and a hydraulic drive head 54. The hydraulic power pack 52 is connected to the proportional valve via hydraulic lines 56 and 58. The hydraulic power pack is also connected to the hydraulic drive head 54, but for the sake of simplicity these connections are not shown in FIG. 1. A diamond drill bit 60 attached to a drill string 62, a water pump 64 and a water supply line 66 are the remaining components of the diamond drill of FIG. 1.

In operation, the feed control apparatus provides the precise control required to maintain a constant rate of penetration (ROP) even under varying load conditions. The proportional valve 12 directs the flow of hydraulic fluid into or out of the feed cylinder 14. Adding fluid to the rod end 22 of the cylinder 14 advances the drive head 54 and thus the drill string 62 into the material being cored, while adding fluid to the head end 18 of the feed cylinder 14 retracts the drill string 62 from the hole. The linear displacement transducer S1 monitors the movement of the feed cylinder 14 and inputs this information back to the positioning module 10. The positioning module 10 calculates a positioning correction and sends a signal, modified accordingly, to the proportional valve, via the line 16, to maintain the desired ROP setpoint. The positioning module 10 of the closed loop control functions independently of the programmable logic control, updating its analog outputs every two milliseconds. The positioning module 10 receives a parameter block, from the programmable logic controller 26, containing various tuning parameters that are required to match the positioning module 10 to the hydraulic and mechanical system being controlled. Once configured with the parameter block, the positioning module 10 is ready to receive commands that define the movement profile desired (i.e. velocity, acceleration, deceleration, and final position).

In order to accommodate varying conditions in the hole, both from a geological perspective (i.e. different rock types, faults, shears etc.) and from a tooling perspective (i.e. as the bit wears and resharpens), the supervisory PLC 26 monitors various other operational parameters on the drill and makes adjustments accordingly. Integral to this system is the hydraulic high performance proportional directional valve (or servo valve), proportional valve 12 that directs hydraulic fluid to each side of the feed cylinder 14 at a high response frequency in such a manner as to allow the ROP to be accurately controlled. The proportional valve 12 receives its command signals from the positioning module 10, which in turn is controlled by the program within the supervisory processor (PLC) 26. Position indication is given by the linear displacement transducer (S1) that communicates directly with the positioning module 10. When a velocity command is issued from the PLC 26 to the positioning module, the positioning module 10 controls the proportional valve 12, independently of the PLC processor and its inherently slower scan time, to maintain the setpoint velocity. The velocity setpoint is adjusted by the PLC 26 in response to various conditions. If the bit weight becomes excessive, or current consumption becomes excessive, or the RPM falls below a preset minimum, or the water pressure goes above or below preset values, or the rate of penetration falls below a preset minimum, the feed rate is reduced and sometimes reversed for a short period of time (called pullback) before either continuing drilling, or initiating a controlled shutdown. This ability to compensate for drill hole variations, and to shut down when a fault occurs, provides superior drilling control, and allows for unattended drilling whereby the operator can attend to other duties while the PLC 26 monitors and controls the drill during the drilling cycle. The method used by the PLC 26 is describe hereinbelow with reference to FIG. 2.

Figure 2:
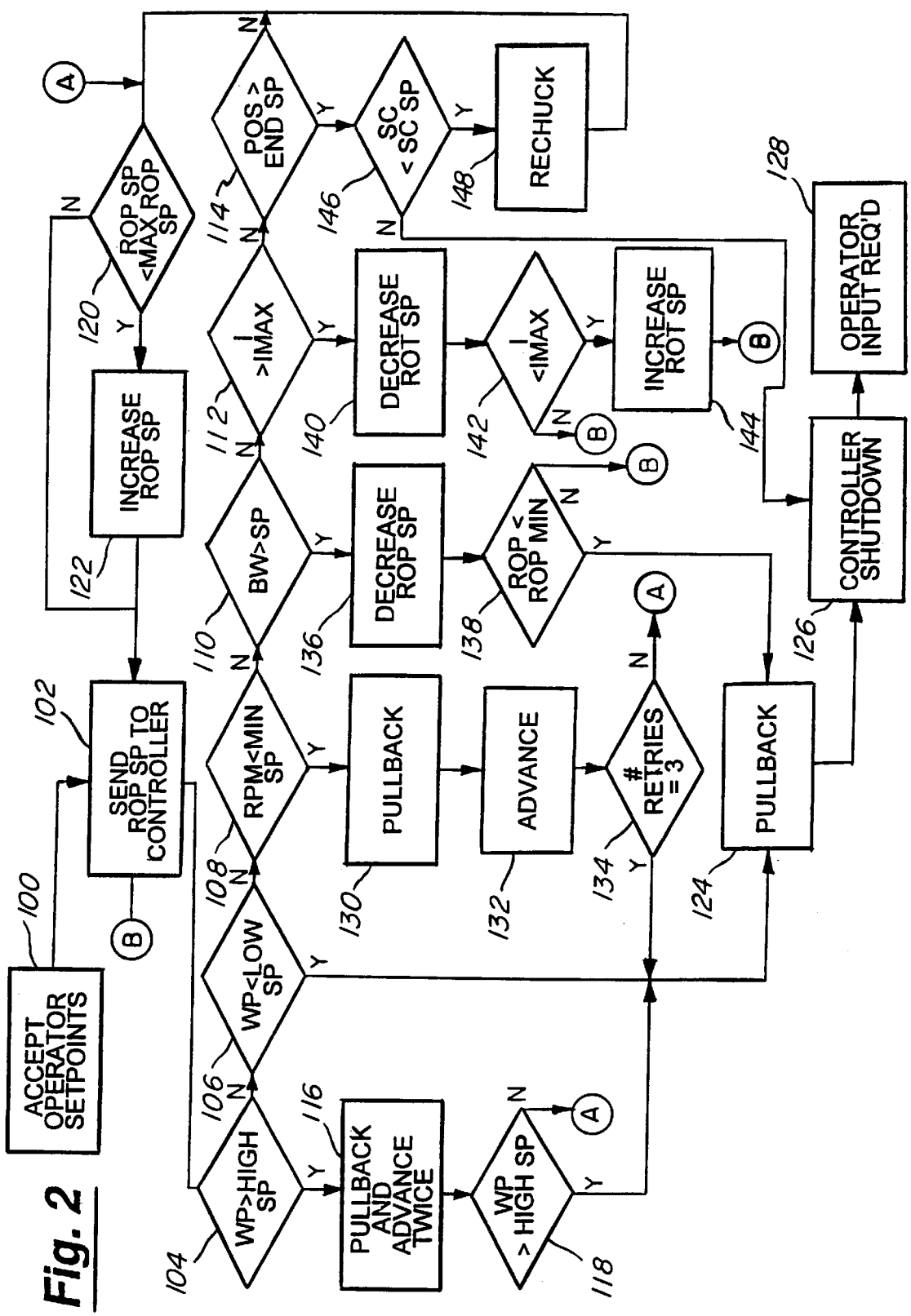
FIG. 2 illustrates, in a flow diagram, the steps performed by the programmable logic controller of FIG. 1, during the drilling control method, in accordance with an embodiment of the present invention.

Referring to FIG. 2 there is illustrated, in a flow diagram, the steps performed by the programmable logic controller of FIG. 1, during the drilling control method, in accordance with an embodiment of the present invention. The flow diagram of FIG. 2 provides the method by which the programmable logic controller 26 modifies the commands sent to the positioning module 10. An operator, using the operator interface 30 adjusts the operational setpoints as required for the drilling conditions at hand, as represented by a process block 100. The operational setpoints include maximum allowable rate of penetration (ROP SP), maximum allowable bit weight (BW SP), rotation hydraulic fluid flow and therefor a resultant chuck RPM (RPM Actual), minimum allowable RPM (RPM Min SP), water flow and therefor a resultant water pressure (WP Actual), and high and low water pressure setpoints (High WP SP and Low WP SP respectively).

Upon initiating the drilling sequence, the PLC 26 sends the ROP SP to the positioning module 10, as represented by a process block 102, which in turn begins to feed the bit toward the rock face. The PLC 26 continues to scan its input modules 28 for information that may require a modification to the feed control.

As represented by decision blocks 104, 106, 108, 110, 112, and 114, the PLC 26 compares drill operation to the set points. For example, at the decision block 104, the PLC 26 compares the actual water pressure to the high water pressure set point (High WP SP). If the water pressure goes above the High WP SP then the feed cylinder will quickly pullback and partially advance twice in succession, as represented by a process block 116, in order to attempt to clear any blockage that may have caused the high water pressure alarm. If the water pressure returns to normal, as represented by a process block 118, the drill feed returns to the ROP SP, as represented by a process block 102. If not, the drill rod string will pullback, as represented by a process block 124, and the unit will go through a controlled shutdown, as represented by a process block 126. An alarm message is displayed which informs the operator of the shutdown situation, to which he would respond accordingly, as represented by a process block 128. A low water pressure, as represented by a yes to the decision block 106, also initiates a pullback and controlled shutdown accompanied with an alarm message.

If the RPM Actual falls below a minimum allowable RPM, as represented by a yes to decision block 108, the drill string is pulled back, as represented by a process block 130 in order to assist in regaining RPM before advancing back to the face, as represented by a process block 132. If this occurs three times within a given period, as represented by a yes to decision block 134, a pullback, as represented by the process block 124 and controlled shutdown, as represented by the process block 126 will occur. Otherwise, after checking the ROP SP as represented by the decision block 120, the method returns to the ROP SP process block 102.

Bit weight (BW), the actual force of the bit on the rock face, is calculated using sensors 2 and 3, and accounting for drill string and drive head weight. The operator has the ability to limit the force of the bit on the face by adjusting the BW SP to the desired maximum. If BW goes above this setpoint, as represented by a decision block 110, the ROP SP is decreased, as represented by a process block 136. In order to prevent polishing the bit, a minimum ROP, as represented by a process block 138, is set which will initiate a pullback, as represented by the process block 124, and a controlled shutdown, as represented by the process block 126, if it falls below. As the BW falls below the BW SP, the ROP SP will be increased, as represented by the process block 122, but not beyond the Max ROP SP, as represented by the decision block 120.

If the current draw by the electric motor on the hydraulic power pack exceeds the maximum allowable, as represented by a yes to the decision block 112, the rotation hydraulic oil flow will be reduced, as represented by a process block 140 to prevent nuisance trips of the motor starter. As current consumption decreases, rotation volume will be increased to the rotation setpoint (ROT SP).

If the end of stroke position (End SP) is reached, as represented by a yes to the decision block 114, and the desired stroke count (SC) is less than the SC SP, as represented by a yes to a decision block 146, the unit will go through a rechuck routine, as represented by a process block 148, and begin drilling from the rechucked position at the top of the stroke. If the SC SP is achieved, the unit will go through a controlled shutdown, as represented by a process block 126.

An alternative embodiment, shown in FIG. 3 integrates the positioning module, programmable logic controller and I/O modules into an integrated programmable logic contoller.

The feed control system described herein has been used on the JKS Boyles B-Series diamond drills. However, it will be evident from the following that this system is capable of controlling the drilling portion of any hydraulically fed diamond drill.

In an exemplary embodiment, the linear displacement transducer is a series BTL-2 by Balluff, the proportional valve is a proportional directional control valve series D1FH by Parker, and the positioning module and programmable logic controller are by Allen-Bradley LPM (Cat. No. 1771-QB) and PLC-5/11 (Cat. No. 1785-LT11), respectively.

While a specific preferred embodiment of the invention has been described, it will be understood that various substitutions and modifications may be made in the described embodiment without departing from the spirit and scope of the invention as defined by the appended claims.

What is claimed is:

1. An apparatus for controlling a diamond drill, wherein, during operation, a bi-directional hydraulic drive, having a head end and a rod end, is coupled to the drill string of said diamond drill allowing either holdback or pulldown forces to be applied thereto, said apparatus comprising:

(a) position sensor means adapted to be couples to said diamond drill for generating a position signal;

(b) computing means, including means for setting a desired rate of drill penetration, for determining a feed rate control signal in response to said position signal and said desired rate of drill penetration; and (c) control valve means for controlling hydraulic flows to said bi-directional hydraulic drive which, in use, is coupled to said diamond drill, to apply either holdback or pulldown forces to the latter, in response to said feed rate control signal to approximate the desired rate of drill penetration, thus accommodating for a varying length and weight of drill string.

2. An apparatus as in claim 1, wherein said control valve means comprises a proportional flow control valve.

3. An apparatus as in claim 2, wherein said position sensor means comprises a linear position transducer.

4. An apparatus as in claim 2, wherein said computing means comprises a programmable logic controller.

5. An apparatus in claim 1, further comprising operation sensor means adapted to be coupled to said diamond drill for generating output signals indicative of the operation thereof, and said computing means being further responsive to said output signals of said operation sensor means by modifying said feed control signal.

6. An apparatus as in claim 5, wherein said operation sensor means comprises pressure sensing means adapted to be coupled to said head end and said rod end of said bi-directional hydraulic cylinder means.

7. An apparatus according to claim 6, in combination with a diamond drilling apparatus including a rotational drive head for the diamond drill, and said bi-directional hydraulic drive being coupled thereto to apply, in use, the holdback or pulldown forces to the drill string.

8. The combination as in claim 7, wherein said rotational drive head comprises a hydraulic rotational drive head and means for supplying hydraulic fluid thereto, and said operation sensor means further comprising means for sensing the pressure of the hydraulic fluid being supplied to said hydraulic rotational drive head.

9. The combination as in claim 8, wherein said operation sensor means further comprises means for sensing the rate of rotation of said rotational drive head.

10. The combination as in claim 9, wherein said diamond drill further comprises a hydraulic pump for providing hydraulic fluid to said rotational drive head and said bi-directional hydraulic drive, and said operation sensor means further comprises means for sensing an overload of said hydraulic pump.

11. The combination as in claim 10, wherein said diamond drill further comprises a source of water for cooling and flushing said diamond drill, and said operation sensor means further comprises means for sensing water pressure.

12. The combination as in claim 7, further comprising an operator interface coupled to said computing means and displaying values of said position sensor, said feed rate control signal, said desired rate of drill penetration, and said output signals of said operation sensor means.

13. The combination as in claim 12, wherein said operator interface further comprises means for setting or adjusting said desired rate of drill penetration.

14. A method of controlling a diamond drill, wherein a bi-directional hydraulic drive is coupled to said diamond drill to apply pulldown or holdback forces thereto, the method comprising the steps of:
   (a) pre-setting a desired rate of drill penetration;
   (b) sensing a position of said drill and generating a position signal in response thereto;
   (c) computing a feed rate control signal in response to said position signal and said pre-set desired rate of drill penetration; and
   (d) applying the pulldown or holdback forces to said drill during a drilling operation in response to said feed rate control signal to approximate the desired rate of drill penetration.

15. A method of controlling a diamond drill, as in claim 14, wherein there is provided a plurality of operation sensors, each having an output value, the method further comprising the steps of:
   (a) monitoring said output values of said plurality of sensors; and
   (b) modifying said desired rate of drill penetration in response to said output values of said plurality of sensors.

16. A method of controlling a diamond drill, as in claim 14, wherein there is provided a plurality of operation sensors, each having an output value, the method further comprising the steps of:
   (a) monitoring output values of said plurality of sensors; and
   (b) modifying said desired rate of drill penetration in response to said output values of said plurality of sensors exceeding pre-set threshold levels.

17. A method of controlling a diamond drill, as in claim 15, wherein the operation sensors include sensors for determining a bit weight value, the method further comprising the steps of:
   (a) monitoring output values of said bit weight sensors and extrapolating said bit weight value therefrom;
   (b) decreasing said desired rate of drill penetration in response to said bit weight value exceeding a pre-set high bit weight threshold level; and
   (c) increasing said desired rate of drill penetration in response to said bit weight value failing below a pre-set low bit weight threshold level.

18. A method of controlling a diamond drill as in claim 15, wherein said drill further includes a rotational drive head, the method further comprising the steps of:
   (a) pre-setting a desired rate of drill rotation;
   (b) sensing a rate of said drill rotation and generating a rotation signal in response thereto;
   (c) computing a rotational rate control signal in response to said rotation signal and said pre-set desired rate of drill rotation; and
   (d) adjusting the flow of hydraulic fluid to said rotational drive head, in response to said rotation rate control signal, to approximate the desired rate of drill rotation.

19. Apparatus for controlling diamond drill feed wherein a bi-directional hydraulic cylinder is coupled, in use, to the drill string of the diamond drill to exert either hold back or pull down forces thereon, said apparatus comprising:
   position sensor means adapted to be coupled to the diamond drill for generating a position signal;
   positioning means for generating a feed control signal in dependence upon the position signal; and
   control valve means for controlling hydraulic flow to the hydraulic cylinder in response to the feed control signal to enable the hydraulic cylinder to apply either holdback or pulldown forces to the drill string to provide a controlled rate of drill penetration and to accommodate for a varying length and weight of drill string.

20. Apparatus as claimed in claim 19 further comprising operation sensor means adapted to be coupled to the diamond drill for generating output signals indicative of the operation thereof and means for modifying the feed control signal in dependence upon the output signals of the operation sensor means.

21. Apparatus as claimed in claim 19 further comprising operator interface means coupled to the means for modifying for allowing an operator to provide input thereto.

22. Apparatus as claimed in claim 19 wherein said position sensor means includes a linear position transducer.

23. Apparatus as claimed in claim 19 wherein said positioning means comprises a linear positioning module.

24. Apparatus as claimed in claim 19 wherein said positioning means comprises an integrated programmable logic controller.

25. Apparatus as claimed in claim 19 wherein said control valve means comprises a proportional flow control valve.

26. Apparatus as claimed in claim 19 wherein said control valve means comprises a servo valve.

27. Apparatus as claimed in claim 20 wherein said operation sensor means includes a water pressure sensor.

28. Apparatus as claimed in claim 20 wherein said operation sensor means includes first and second pressure transducers adapted to be coupled to first and second ends of the hydraulic cylinder.

29. Apparatus as claimed in claim 20 wherein said operation sensor means includes a rotational pressure sensor adapted to be coupled to a hydraulic drive head of the diamond drill.

30. Apparatus as claimed in claim 20 wherein said operation sensor means includes an RPM sensor adapted to be coupled to a drive head of the diamond drill.

31. Apparatus as claimed in claim 30 wherein said operation sensor means includes a current sensor coupled to a power supply line for the drive head of the diamond drill.

32. Apparatus for controlling the feed of a diamond drill, comprising:

a drive head for rotating the diamond drill;

a feed cylinder connected to the drive head to effect feeding of the drill;

a linear position sensor coupled to the feed cylinder for generating a position signal;

a positioning module for generating a feed control signal in dependence upon the position signal;

a flow control valve having two hydraulic ports connected to the feed cylinder and responsive to the feed control signal for controlling flows through the two hydraulic ports;

a plurality of operation sensors adapted to be coupled to the diamond drill for generating operation status signals;

a plurality of input modules for receiving the operation status signals and converting them to digital operation status signals; and a programmable logic controller connected to the plurality of input modules for modifying the feed control signal in dependence upon the digital operation status signals to control the flow through said two hydraulic ports such that said feed cylinder applies during use, holdback or pulldown forces to said drive head sufficient to accommodate and compensate for a varying length and weight of drill string.

33. Apparatus as claimed in claim 32 wherein said operation sensor means includes a water pressure sensor.

34. Apparatus as claimed in claim 32 wherein said operation sensor means includes first and second pressure transducers coupled to first and second ends of the hydraulic feed cylinder.

35. Apparatus as claimed in claim 32 wherein said operation sensor means includes an RPM sensor coupled to said drive head of the diamond drill.

36. Apparatus as claimed in claim 32 wherein said operation sensor means includes a rotational flow sensor coupled to a hydraulic power pack of the diamond drill.

37. Apparatus as claimed in claim 36 wherein said operation sensor means includes a current sensor coupled to a power supply line in the hydraulic power pack.

38. A diamond drill comprising:

a hydraulic drive head;

a hydraulic feed cylinder coupled to the drive head for changing the linear position of the drive head;

a feed control apparatus including a linear position sensor coupled to the feed cylinder for generating a position signal;

a positioning module for generating a feed control signal in dependence upon the position signal;

a flow control valve having two hydraulic ports connected to the feed cylinder and responsive to the feed control signal for controlling flows through the two hydraulic ports;

a plurality of operation sensors adapted to be operatively coupled to the diamond drill during use for generating operation status signals;

a plurality of input modules for receiving the operation status signals and converting them to digital operation status signals; and a programmable logic controller connected to the plurality of input modules for modifying the feed control signal in dependence upon the digital operation status signals to control the flow through said two hydraulic ports such that said feed cylinder applies during use holdback or pulldown forces to said drive head sufficient to accommodate and compensate for a varying length and weight of drill string.

39. A diamond drill comprising:

a hydraulic drive head for a drill string;

a hydraulic feed cylinder coupled to the drive head for changing the position of the drive head linearly of the drill string;

a feed control apparatus including a linear position sensor coupled to the feed cylinder for generating a position signal;

an integrated programmable logic controller including positioning means, input means and logic means, said positioning means generating a feed control signal representing drill feed rate in dependence upon the position signal;

a flow control valve having two hydraulic ports connected to the feed cylinder and responsive to the feed control signal for controlling the flows through the two hydraulic ports;

a plurality of operation sensors adapted to be operatively coupled to the diamond drill during use for generating operation status signals;

said input means being capable of receiving the operation status signals and converting them to digital operation status signals; and said logic means connected to said input means for modifying the feed control signal in dependence upon the digital status signals in such manner that said feed cylinder applies holdback or pulldown forces to said drive head during use to compensate for changes in drill string length and weight so as to maintain a desired drill feed rate.

* * * * *